(12) United States Patent
Balakrishnan et al.

(10) Patent No.: US 6,611,567 B1
(45) Date of Patent: Aug. 26, 2003

(54) METHOD AND APPARATUS FOR PULSE SHAPING

(75) Inventors: Jaiganesh Balakrishnan, Ithaca, NY (US); Markus Rupp, Lincroft, NJ (US)

(73) Assignee: Agere Systems, Inc., Allentown, PA (US)

( * ) Notice: Subject to any disclaimer, the term of this patent is extended or adjusted under 35 U.S.C. 154(b) by 0 days.

(21) Appl. No.: 09/240,005

(22) Filed: Jan. 29, 1999

(51) Int. Cl.$^7$ .............................................. H04L 27/36
(52) U.S. Cl. ...................................................... 375/298
(58) Field of Search ................................ 375/238, 239, 375/261, 286, 289, 298, 308, 331, 332, 342, 264; 370/206, 208, 211, 212; 327/29, 31, 36, 38, 3, 10, 100, 164, 165, 168, 167, 171, 172, 291, 295; 326/29; 332/112

(56) References Cited

U.S. PATENT DOCUMENTS

| | | | | | |
|---|---|---|---|---|---|
| 4,023,028 | A | * | 5/1977 | Dillard ........................ | 708/405 |
| 4,945,505 | A | * | 7/1990 | Wiener et al. ............... | 708/204 |
| 5,020,075 | A | * | 5/1991 | Tachika ....................... | 375/206 |
| 5,142,540 | A | * | 8/1992 | Glasser ....................... | 714/772 |
| 5,293,408 | A | * | 3/1994 | Takahashi et al. .......... | 375/349 |
| 5,446,423 | A | * | 8/1995 | Bienz et al. ................. | 332/170 |
| 5,550,868 | A | * | 8/1996 | Boccuzzi .................... | 375/330 |
| 5,610,948 | A | * | 3/1997 | Ninomiya et al. .......... | 375/324 |
| 5,796,782 | A | * | 8/1998 | Sagawa ....................... | 375/296 |
| 5,926,065 | A | * | 7/1999 | Wakai et al. ................ | 329/304 |
| 5,949,827 | A | * | 9/1999 | DeLuca et al. .............. | 375/324 |
| 5,963,597 | A | * | 10/1999 | Okawa ........................ | 329/308 |
| 5,978,420 | A | * | 11/1999 | Koslov et al. ............... | 375/295 |
| 6,009,090 | A | * | 12/1999 | Oishi et al. .................. | 370/320 |
| 6,023,719 | A | * | 2/2000 | Barak et al. ................. | 708/405 |
| 6,094,458 | A | * | 7/2000 | Hellberg ...................... | 375/242 |
| 6,181,674 | B1 | * | 1/2001 | Xin et al. .................... | 370/203 |
| 6,194,977 | B1 | * | 2/2001 | Wang .......................... | 332/103 |
| 6,205,188 | B1 | * | 3/2001 | Stott et al. ................... | 375/344 |
| 6,222,873 | B1 | * | 4/2001 | Bang et al. .................. | 370/206 |
| 6,246,697 | B1 | * | 6/2001 | Whinnett et al. ........... | 370/479 |
| 6,263,027 | B1 | * | 7/2001 | Yang et al. .................. | 375/302 |
| 6,278,391 | B1 | * | 8/2001 | Walker ........................ | 341/118 |
| 6,307,907 | B1 | * | 10/2001 | Kim ............................ | 375/377 |
| 6,320,915 | B1 | * | 11/2001 | Stott et al. ................... | 375/340 |

OTHER PUBLICATIONS

"Digital Radio Theory and Measurement". Hewlett Packard, Application Note 355A. *An introduction to digital radio principles, practical problems, and measurement solutions.*

* cited by examiner

*Primary Examiner*—Emmanuel Bayard
(74) *Attorney, Agent, or Firm*—Harness, Dickey & Pierce, P.L.C.

(57) ABSTRACT

In the method of pulse shaping according to the present invention, a set of bits representing a symbol is received, and an output value is generated by adding or subtracting a received coefficient and a received value based on a first predetermined one of the set of bits. The generated output value is then supplied as either a real or imaginary output value based on at least a second predetermined one of the set of bits.

22 Claims, 8 Drawing Sheets

METHOD AND APPARATUS FOR PULSE SHAPING

BACKGROUND OF THE INVENTION

1. Field of the Invention

The present invention relates to a method and apparatus for pulse shaping output of a digital modulator.

2. Description of the Relate Art

Digital communication relies on numerous different, albeit related, forms of digital modulation such as phase shift keying (PSK), bi-phase shift keying (BPSK), quadrature phase shift keying (QPSK or 4-PSK), and quadrature amplitude modulation (QAM).

BPSK will be described with reference to FIG. 1. As shown, the magnitude of a reference carrier is constant, and to transmit either a 0 or a 1, the phase thereof is "keyed" or switched between 0° and 180°. A receiver then decides whether a 0 or a 1 was transmitted based on the phase of the received carrier, and generates the original data stream. With this simple scheme, one bit of information is transmitted with each state or symbol, so that the carrier phase is keyed at the data rate. FIG. 1 also illustrates the constellation for BPSK. As shown, the BPSK constellation diagram includes two points in the I-Q plane where I stands for in-phase (i.e., phase reference) and Q stands for quadrature (i.e., 90° out-of-phase). The two points in the BPSK constellation diagram represent the position of the signal at the "timing instance". The timing instance is when the receiver interprets the signal. The signal can only be at one position at a time, but the constellation can be thought of as having persistence so that all proper states appear. Constellation diagrams such as in FIG. 1 typically do not show the transition between states and it should be noted that this transition does take a finite time. But for clarity, the transitions are not shown otherwise traces connecting the two states would clutter the diagram.

FIG. 2 illustrates the constellation diagram for QPSK. As shown, four different states exist in the QPSK diagram at phase values of 45°, 135°, 225°, and 315°. As further shown, each state corresponds to a symbol representing two bits. Because the data is taken two bits at a time to form a symbol, the symbol rate is half the bit rate. As a result, QPSK requires half the band width of BPSK for the same bit rate.

As a further example, FIG. 3 illustrates the constellation for 16 QAM. According to this modulation format, four bits of serial data are encoded as a single phase state or symbol. In order to generate this type of modulation, the I and Q carriers need to take four different possible levels of amplitude, typically +3, +1, −1, −3, depending on the code being transmitted. In 16 QAM, four bits of serial data are transmitted with each symbol.

By passing these modulation schemes immediately through a bandlimited channel, the pulses will spread in time, and the pulse for each symbol will smear into time intervals of succeeding symbols. This causes intersymbol interference and leads to an increased probability of the receiver making an error in detecting a symbol. Lowering this undesired effect by increasing bandwidth is not possible in many applications such as wireless communication systems because these applications operate with minimal bandwidth. Thus, techniques that reduce the bandwidth and suppress out-of-band radiation, while reducing intersymbol interference, are highly desirable.

Therefore, pulse shaping plays a crucial role in making digitally modulated data recognizable during filtering of the digitally modulated data to an acceptable bandwidth. The term data as used in this application refers to the modulation output, and not what that modulation output represents (e.g., audio information).

A typical pulse shaping operation performs the following function:

$$p_l(k) = \sum_{m=0}^{M-1} s(k-m)c(Lm+l) \text{ for } l = 0, 1, \ldots, L-1 \quad (1)$$

where $s(k-m)$ represents the symbol output from the digital modulation operation to be transmitted; $c(Lm+1)$ represents a filter coefficient; L represent the total number of phases or cycles in the digital modulation (not the phase of a symbol); M represents the total number of coefficients at each phase, which depends on the level of filtering being performed; and l represents the current phase. The symbols $s(k)$ are generated by the digital modulation operation, and the total number of phases L, the coefficients $c(k)$, and the total number of coefficients M at each phase are predetermined based on the format of the digital modulation and the type of filtering being performed.

As evidenced by equation (1), the pulse shaping operation requires many multiplication and addition operations. In, for example, a modem transceiver, the pulse shaping operation consumes a large portion of the modem's overall computational power. Accordingly, a need exists for a greatly simplified method of pulse shaping which does not consume large amounts of computational power; namely, performs relatively few mathematical operations.

SUMMARY OF THE INVENTION

The method of pulse shaping and the pulse shaper according to the present invention significantly reduce the amount of computation required to perform the pulse shaping operation by reducing the pulse shaping operation to simple add or subtract arithmetic operations. The inventors of the present invention recognized the following two attributes of each set of bits representing a symbol: (1) one of the bits indicates whether the coefficient corresponding to that set of bits for forming a pulse shaped value should be added or subtracted, and (2) another bit in the set of bits indicates whether the coefficient being added or subtracted should be added or subtracted to form a real or imaginary output value of the pulse shaping operation. Therefore, pulse shaped values can be generated according to the present invention by adding or subtracting a received coefficient to or from a received value based on the bit in the set of bits indicating whether addition or subtraction should take place, and then selectively supplying the output thereof as either a real or imaginary result based on the other bit in the set of bits indicating whether the generated value represents a real or imaginary value.

DETAILED DESCRIPTION OF THE DRAWINGS

The present invention will become more fully understood from the detailed description given below and the accompanying drawings which are given by way of illustration only, wherein like reference numerals designate corresponding parts in the various drawings, and wherein.

Figure 16:
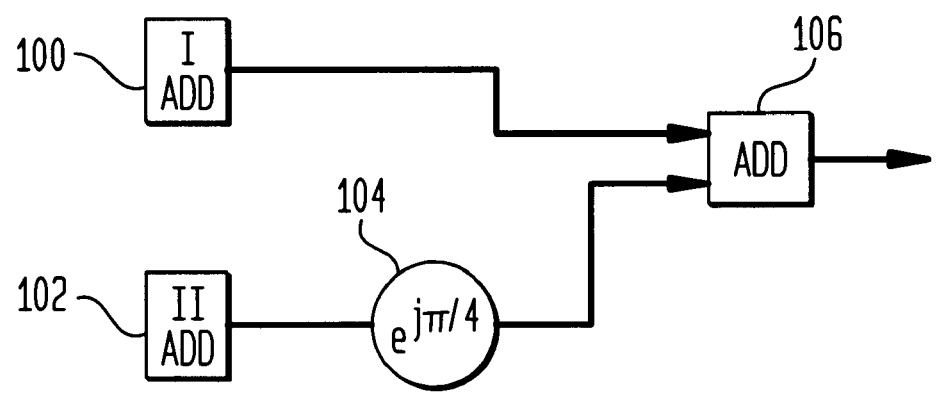
Figure 15:
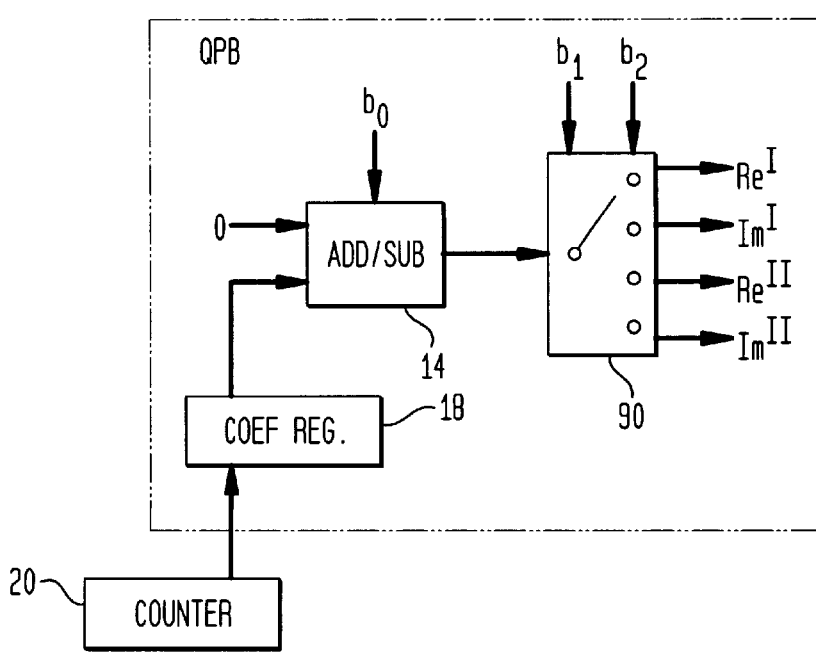

FIG. 15 illustrates the details of the 8 PSK pulse shaping block forming an 8-phase shift keying pulse shaper according to the present invention; and FIG. 16 illustrates the structure for combining the two real or the two imaginary outputs produced by the 8 PSK processing blocks in the 8-phase shift keying pulse shaper according to the present invention.

PULSE SHAPING FOR QPSK

The pulse shaping method and apparatus according to the present invention will first be explained with respect to the simplest digital modulation format—QPSK.

Figure 1:
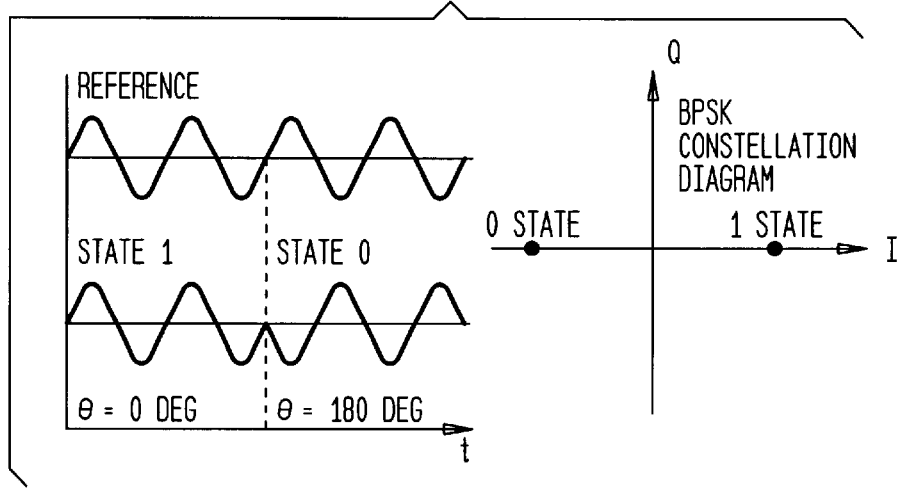
FIG. 1 illustrates the reference carrier, keyed reference carrier and constellation diagram for bi-phase shift keying.
Figure 2:
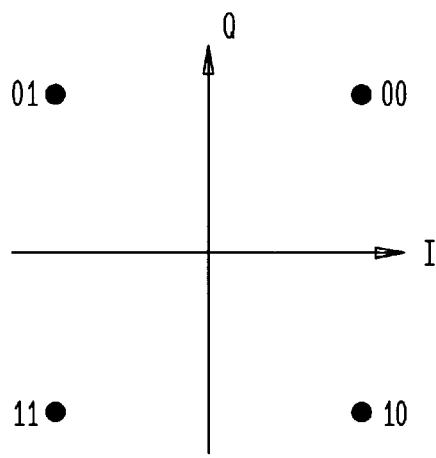
FIG. 2 illustrates the constellation diagram for quadrature phase shift keying.
Figure 3:
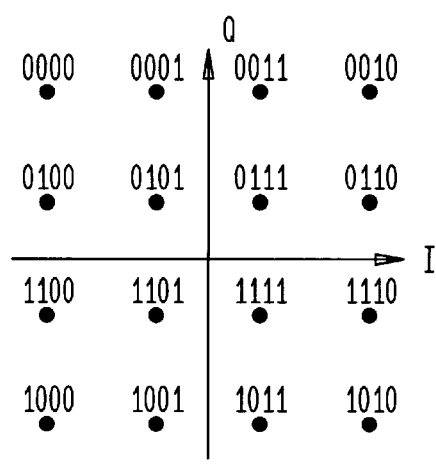
FIG. 3 illustrates the constellation diagram for 16 quadrature amplitude modulation.
Figure 4:
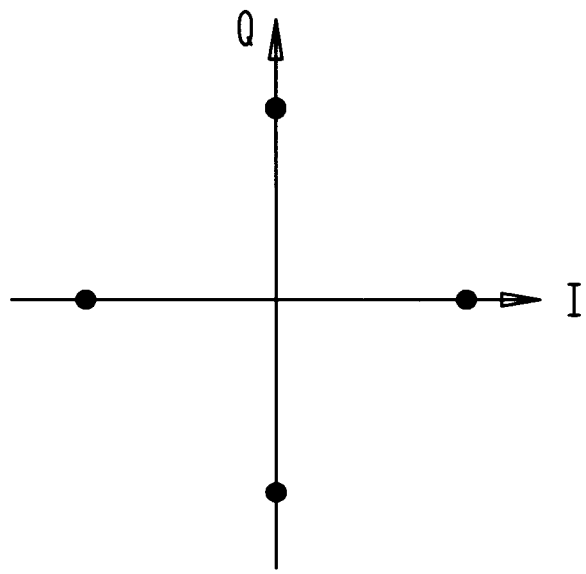
FIG. 4 illustrates the constellation for quadrature phase shift keying rotated according to the present invention.

FIG. 2 illustrates the symbols for QPSK as $$\frac{\sqrt{2}}{2}\{(1+j),(1-j),(-1-j),(-1+j)\},$$

but the symbols could be rotated and appear as shown in FIG. 4. As a result, in FIG. 4 the symbols are $\{1, j, -1, -j\}$. As the discussion below will demonstrate, viewing the symbols in this manner does not really require a multiplication operation to perform the pulse shaping, but rather selection of whether the real or imaginary portion of equation (1) is addressed and whether addition or subtraction is required.

Namely, each symbol s(k) in equation (1) will have one of four values as shown in Table 1 below, and therefore, can be represented by a two bit code $b_0$ and $b_1$.

TABLE 1

| $b_0$ | $b_1$ | S(k) |
|---|---|---|
| 0 | 0 | 1 |
| 0 | 1 | j |
| 1 | 0 | −1 |
| 1 | 1 | −j |

Accordingly, second bit $b_1$ indicates whether the real or imaginary part of equation (1) should be used and first bit $b_0$ indicates whether addition or subtraction of the coefficient is required.

Breaking equation (1) into the real and imaginary parts, and substituting first and second bits $b_0$ and $b_1$ therein for s(k) results in equations (2) and (3) below.

$$\text{Real}(p_l(k)) = \sum_{m=0}^{M-1} c(Lm+l)(1-2b_0(k-m))(1-b_1(k-m)) \text{ for } l=0,\ldots,L-1 \quad (2)$$

$$\text{Imag}(p_l(k)) = \sum_{m=0}^{M-1} c(Lm+l)(1-2b_0(k-m))b_1(k-m) \text{ for } l=0,1,\ldots,L-1 \quad (3)$$

Table 2 below illustrates an example of the coefficients used in equations (2) and (3) discussed above.

TABLE 2

| | m = | | | |
|---|---|---|---|---|
| | 0 | 1 | 2 | 3 |
| l = | | | | |
| 0 | $c_0$ | $c_4$ | $c_8$ | $c_{12}$ |
| 1 | $c_1$ | $c_5$ | $c_9$ | $c_{13}$ |
| 2 | $c_2$ | $c_6$ | $c_{10}$ | $c_{14}$ |
| 3 | $c_3$ | $c_7$ | $c_{11}$ | $c_{15}$ |

As shown, the number of coefficients M per phase l is four, and the number of phases L is also four.

Figure 5:
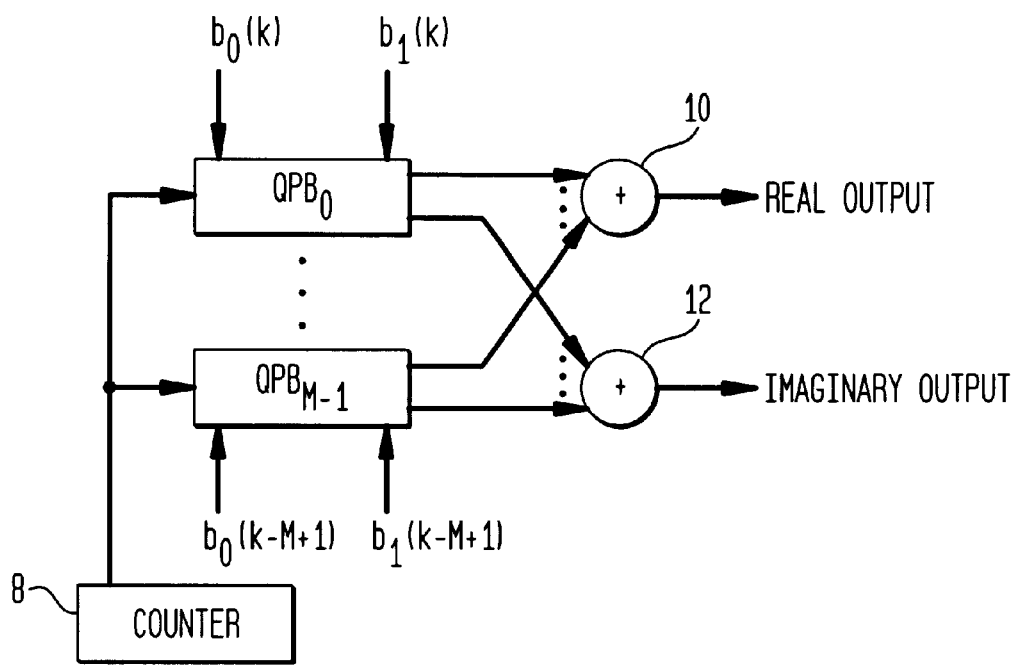
FIG. 5 illustrates a pulse shaping apparatus for quadrature phase shift keying according to a first embodiment of the present invention.

A first embodiment of pulse shaping apparatus for QPSK will be described with respect to FIGS. 5–6. As shown in FIG. 5, the pulse shaping apparatus includes M QPSK processing blocks $QPB_0$–$QPB_{M-1}$. The subscripted value in the reference label for the QPSK processing blocks correlates to one of the M coefficients for a particular phase.

In accordance with Table 1 discussed above, the digital modulator generates first and second bits $b_0$, $b_1$ for each symbol, and the pulse shaping apparatus of FIG. 5 receives the first and second bits $b_0$, $b_1$ for M symbols at a time. More specifically, as shown in FIG. 5, the M QPSK processing blocks $QPB_0$–$QPB_{M-1}$ respectively receive the kth-(k−M+1)th pairs of first and second bits $b_0$, $b_1$.

Each of the QPSK processing blocks $QPB_0$–$QPB_{M-1}$ generates real and imaginary output values based on the first and second bits $b_0$, $b_1$ received thereby and a phase count output by a counter 20. The phase count output by the counter 20 represents the cycle of the pulse shaping operation. Accordingly, the counter 20 repeatedly counts from 0 to L−1. The real output values from the QPSK processing blocks $QPB_0$–$QPB_{M-1}$ are received by a real adder 10, and the imaginary output values are received by an imaginary adder 12. The real adder 10 adds the real output values to generate a real output of the pulse shaping apparatus, and the imaginary adder 12 adds the imaginary output values to generate an imaginary output of the pulse shaping apparatus.

Figure 6:
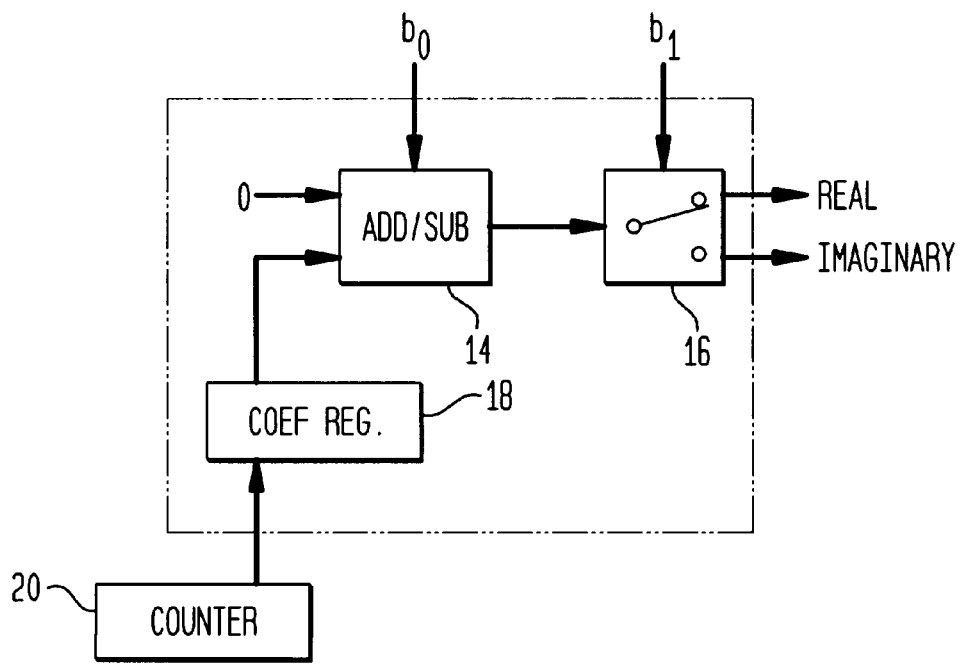
FIG. 6 illustrates the details of a QPSK processing block illustrated in FIG. 5.

Each of the QPSK processing blocks $QPB_0$–$QPB_{M-1}$ has the same structure as shown in FIG. 6. As shown, a QPSK processing block QPB includes an add/subtract unit 14 which either adds a coefficient output from a coefficient register 18 to a null value or subtracts the coefficient from the null value based on the value of the first bit $b_0$ received by the QPSK processing block QPB. Accordingly, the add/subtract block 14 outputs either a positive or negative value of the coefficient output from the coefficient register 18.

As further shown in FIG. 6, a first switch 16 receives the output of the add/subtract block 14, and supplies the output of the add/subtract block 14 to either the real or imaginary output of the QPSK processing block QPB based on the value of the second bit $b_1$ received by the QPSK processing block QPB.

The operation of the pulse shaping apparatus according to the first embodiment of the present invention will now be described.

The coefficient register 18 stores the coefficients associated with the QPSK processing block QPB for each cycle of the pulse shaping apparatus. For instance, the coefficient register 18 for the first QPSK processing block $QPB_0$ stores, with reference to Table 2, coefficients $c_0$, $c_1$, $c_2$, and $c_3$. Based on the phase count received from the counter 20, the coefficient register 18 outputs the coefficient corresponding thereto. Continuing with the above example, if the phase count is 2, then the coefficient register 18 outputs the coefficient $c_2$.

As previously discussed above with respect to Table 1, a first bit $b_0$ having a value of 0 indicates that addition of a coefficient is required, while a first bit $b_0$ having a value of 1 indicates that subtraction of a coefficient is required. Accordingly, the add/subtract block 14 in each QPSK processing block QPB will output a positive value of the coefficient received from the coefficient register 18 when the first bit $b_0$ received thereby has a value of 0, and will output a negative value of the coefficient received from the coefficient register 18 when the value of the first bit $b_0$ received thereby is 1.

As also discussed above with respect to Table 1, when the second bit $b_1$ has a value of 0, then the value received from the add/subtract block 14 relates to the real output value of the QPSK processing block QPB, while a value of 1 for the second bit $b_1$ indicates that the value received from the add/subtract block 14 relates to the imaginary output value of the QPSK processing block QPB. As a result, the switch 16 supplies the output of the add/subtract block 14 to the real output of the QPSK processing block QPB when the second bit $b_1$ is 0, and supplies the output of the add/subtract block 14 to the imaginary output of the QPSK processing block QPB when the second bit $b_1$ is 1.

Referring back to FIG. 5, the real adder 10 adds the real output values from the QPSK processing blocks $QPB_0$–$QPB_{M-1}$, and the imaginary adder 12 adds the imaginary output values from the QPSK processing blocks $QPB_0$–$QPB_{M-1}$. The output of the real adder 10 serves as the real output of the pulse shaping apparatus, and the output of the imaginary adder 12 serves as the imaginary output of the pulse shaping apparatus.

The same kth-(k–M+1)th pairs of first and second bits $b_0$, $b_1$ are supplied to the M QPSK processing blocks $QPB_0$–$QPB_{M-1}$, respectively, as the counter 20 counts from 0 to L–1. For each cycle or phase, from 0 to L–1, the real adder 10 and the imaginary adder 12 generate real and imaginary output values. When the counter 20 begins re-counting from 0 again, a new group of kth-(k–M+1)th pairs of first and second bits are supplied to the M QPSK processing blocks $QPB_0$–$QPB_{M-1}$, respectively.

Accordingly, based on the processing speed of the pulse shaping apparatus, each group of kth to (k–M+1)th pairs of first and second bits $b_0$, $b_1$ are supplied to the M QPSK processing blocks $QPB_0$–$QPB_{M-1}$.

The pulse shaping apparatus according to the first embodiment of the present invention for QPSK modulation does not perform multiplication, and instead provides a greatly simplified method of pulse shaping which does not consume large amounts of computational power but does require a large amount of chip area.

Figure 7:
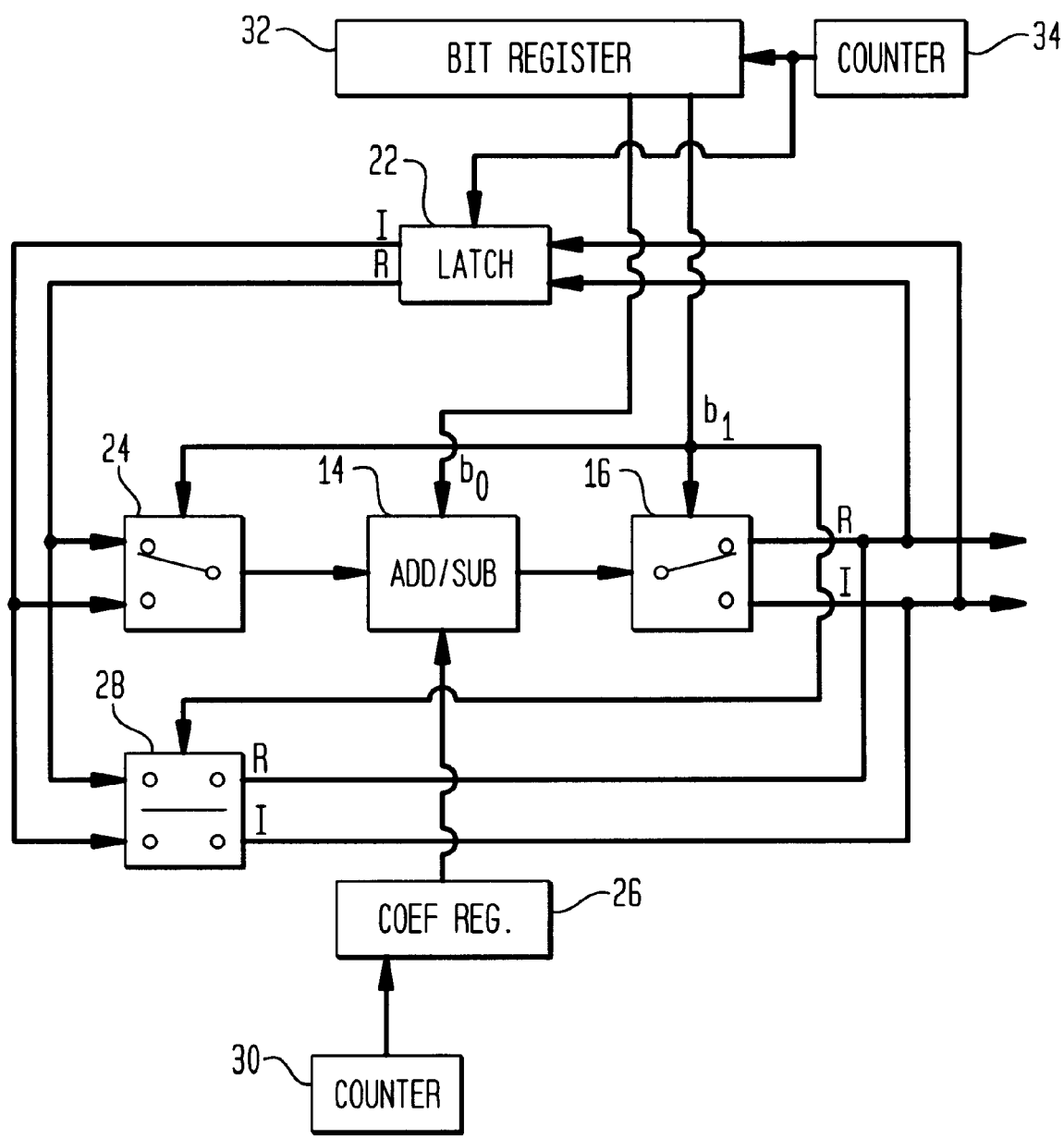
FIG. 7 illustrates another embodiment of a quadrature phase shift keying pulse shaper according to the present invention.

A second embodiment of the pulse'shaping apparatus for QPSK modulation will be described with respect to FIG. 7. The embodiment of FIG. 7 requires less hardware than the embodiment discussed above with respect to FIG. 5, but does so by sacrificing processing speed. As shown in FIG. 7, the pulse shaping apparatus includes the first switch 16 supplying the output of the add/subtract block 14 to either a real or imaginary output of the pulse shaper based on the value of the second bit $b_1$. A latch 22 latches the real and imaginary outputs of the pulse shaper. The real and imaginary values stored by the latch 22 and are supplied to real and imaginary inputs of a second switch 24 and a third switch 28. The second switch 24 supplies one of the real and imaginary inputs to the add/subtract block 14, based on the value of the second bit $b_1$. The add/subtract block 14 adds or subtracts a coefficient received from a coefficient register 26 to or from the value received from the second switch 24 based on the value of the first bit $b_0$. The third switch 28 supplies the one of the real and imaginary inputs not selected by the second switch 24 to the real or imaginary output of the pulse shaper based on the second bit $b_1$.

The coefficient register 26 stores all the coefficients for each phase l and outputs a coefficient based on a count value received from a first counter 30. The first counter 30 counts from LM to 0 causing the coefficients for each phase to be sequentially output from the coefficient register 26. For instance, with reference to Table 2, the coefficients $c_{15}$, $c_{11}$, $c_7$, $c_3$, $c_{14}$, $c_{10}$, . . . , $c_8$, $c_4$, $c_0$ would be output in sequence.

A bit register 32 in this embodiment stores the (k–M+1)th-kth pairs of first and second bits $b_0$, $b_1$ for the (k–M+1)th-kth symbols. The bit register 32 outputs a pair of first and second bits $b_0$, $b_1$, based on the output from a second counter 34. The second counter 34 counts from (M–1) to 0 in synchronization with the first counter 30. In response to the counter 34 counting from (M–1) to 0, the bit register 32 outputs the (k–M+1)th first and second bits $b_0$ (k–M–1), $b_1$(k–M–1) to kth first and second bits $b_0$(k), $b_1$(k), respectively. For instance, with reference to Table 2, when the coefficient register 26 outputs coefficients $c_3$, $c_2$, $c_1$, or $c_0$, the bit register 32 in response to the output from the second counter 34 will output the kth first and second bits $b_0$(k), $b_1$(k).

The operation of the pulse shaping apparatus illustrated in FIG. 7 will now be described in detail. Unlike the embodiment discussed above with respect to FIGS. 5–6, the pairs of first and second bits $b_0$, $b_1$ for the (k–M+1)th-kth symbols are supplied one pair at a time from the bit register 32 in accordance with the count value from the second counter 34.

In synchronization with the supply of each pair of first and second bits $b_0$, $b_1$, the first counter 30 counts from LM to 0 to trigger the output of the appropriate coefficient from the coefficient register 26.

The add/subtract block 14 will then add the coefficient from the coefficient register 26 to the value output from the first switch 24 when the value of the first bit $b_0$ is 0, and will subtract the coefficient output from the coefficient register 26 from the value supplied by the first switch 24 when the first bit $b_0$ is 1. The value of the second bit $b_1$ indicates whether a real or imaginary value is being processed. Accordingly, when the second bit $b_1$ is 0, the first switch 24 supplies the real value in the latch 22 to the add/subtract block 14, and when the second bit $b_1$ is 1, the first switch 24 supplies the imaginary value stored in the first latch 22 to the add/subtract block 14. Similarly, the second switch 16 will supply the output of the add/subtract block 14 to the real output of the pulse shaper when the second bit $b_1$ is 0, and will supply the output of the add/subtract block 14 to the imaginary output of the pulse shaper when the second bit $b_1$ is 1. Meanwhile, the third switch 28 supplies the real value in the latch 22 to the real output of the pulse shaper when the second bit $b_1$ is 1, and supplies the imaginary value in the latch 22 to the imaginary output of the pulse shaper when the second bit is a 0.

When the first switch 16 and the third switch 28 supply real and imaginary values to the real and imaginary outputs of the pulse shaper, the latch 22 latches the real and imaginary values for feedback to the second and third switches 24 and 28. Accordingly, when the second counter 34 counts down to 0, the real and imaginary values at the real and imaginary outputs of the pulse shaper will be the real and imaginary output values for a particular phase 1.

At this time, the real and imaginary output values from the pulse shaper will be used. Further, at this time, the latch 22 is reset to store null values in response to the count value of the counter 34 reaching 0 so that the real and imaginary output values for the next phase can be generated.

Instead of outputting coefficients in the coefficient register 26, based on the output of the first counter 30, two counter values could be used to address a coefficient. The second counter 34 would supply one of those count values, which would indicate which of the 0 to M-1 columns of coefficients to select (see Table 2). The other counter would be the same as the counter 20, and would supply the phase count indicating the cycle or phase of the pulse shaper. Therefore, the coefficient associated with the cycle of the phase count in the column of coefficients indicated by the output of the second counter 34 would be output by the coefficient register.

As one skilled in the art will appreciate, this embodiment significantly reduces the hardware requirements of the pulse shaping apparatus according to the present invention as compared to the previously described embodiment. This reduction in hardware, comes with a cost in processing speed. However, all of the embodiments described thus far significantly reduce the computational power needed to perform the pulse shaping operation by eliminating any multiplication operations.

PULSE SHAPING FOR 16 QAM

Figure 8A:
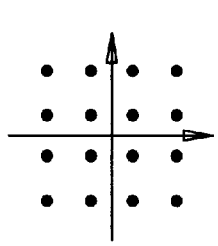
FIG. 8A–8F depict the dissection of the 16 quadrature amplitude modulation constellation into four quadrature phase shift keying constellations according to the present invention.
Figure 8B:
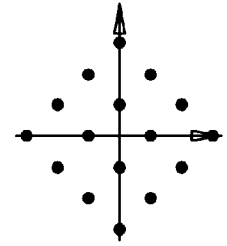
Figure 8C:
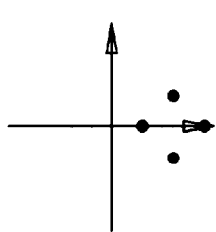
Figure 8D:
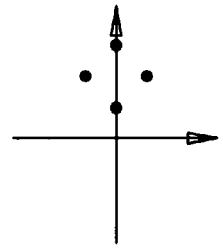
Figure 8E:
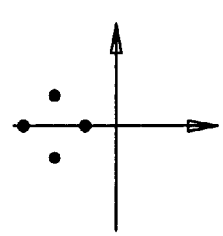
Figure 8F:
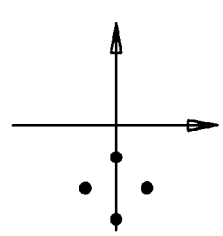

Pulse shaping according to the present invention for 16 QAM is not much different than that for QPSK. First one must be aware that the 16 QAM constellation can be dissected into four QPSK constellations. FIGS. 8A–8F depict how this is done. FIG. 8A shows the original 16 QAM constellation and FIG. 8B shows a version that is rotated by 90 degrees. From this rotated version four subsets, each a QPSK on their own are taken as shown in FIGS. 8C–8F. Each subset is shifted from the origin by one of the four values $\{2, 2j, -2, -2j\}$. Since all four subsets are just laterally shifted versions of each other, the basic pulse shaping operation according to the present invention for QPSK can remain for each subset, and only a correction needs to be made corresponding to the shift. It is assumed that the 16 QAM symbol is represented by a four bit word $b_3b_2b_1b_0$. The first and second bits $b_0,b_1$ can be interpreted as before while third and fourth bits $b_2,b_3$ now define one of the four QPSK subclasses.

Figure 9:
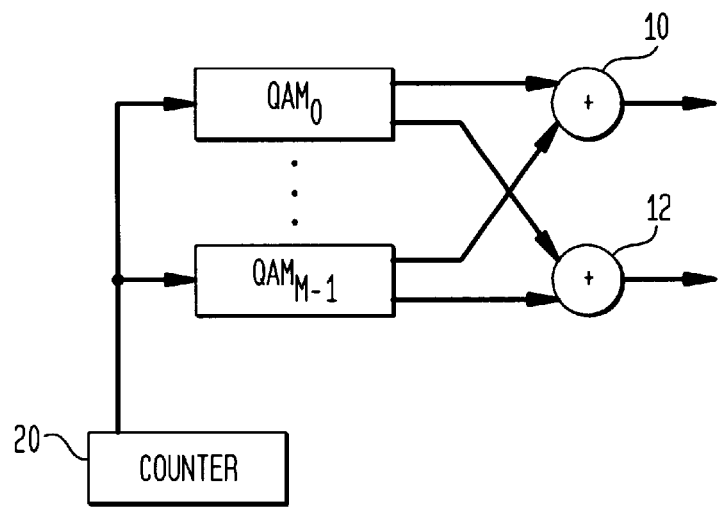
FIG. 9 illustrates an embodiment of the pulse shaping apparatus for quadrature amplitude modulation according to the present invention.

Accordingly, the 16 QAM pulse shaper can have substantially the same structure as the QPSK pulse shaper. For instance, FIG. 9 illustrates a 16 QAM pulse shaper having substantially the same structure as the QPSK pulse shaper shown in FIG. 5. However, instead of including M QPSK processing blocks $QPB_0$–$QPB_{M-1}$, the 16 QAM pulse shaper shown in FIG. 9 includes M 16 QAM pulse shaping blocks $QAM_0$–$QAM_{M-1}$. Each of the M 16 QAM processing blocks $QAM_0$–$QAM_{M-1}$ respectively receives the first, second, third and fourth bits $b_0,b_1,b_2,b_3$ for the kth to (k-M+1)th symbols in the same manner that the QPSK processing blocks $QPB_0$–$QPB_{M-1}$ received the first and second bits $b_0,b_1$ for the kth to (k-M+1)th symbols, and the M QAM processing blocks $QAM_0$–$QAM_{M-1}$ generate real or imaginary output values based on the respectively received first-fourth bits $b_0,b_1,b_2,b_3$ and the phase count from the counter 20. Also, the real adder 10 adds the real output values from the M 16 QAM processing blocks $QAM_0$–$QAM_{M-1}$, and the imaginary adder 12 adds the imaginary output values from the M 16 QAM processing blocks $QAM_0$–$QAM_{M-1}$.

Figure 10:
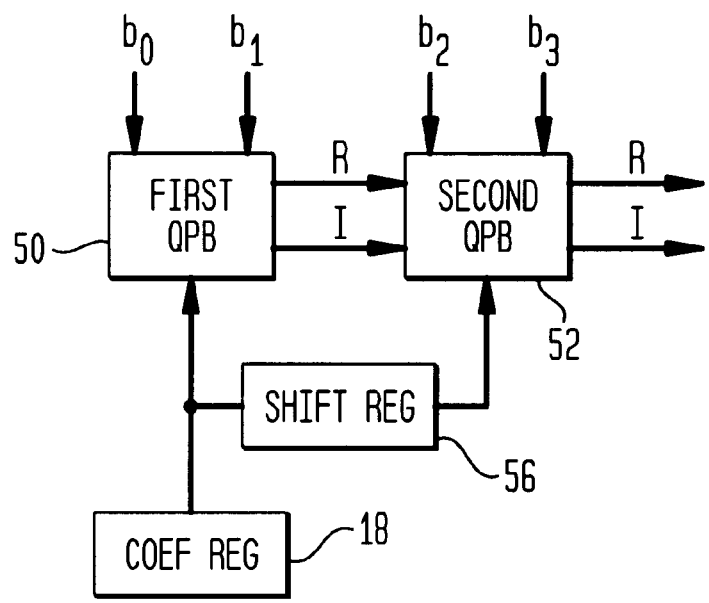
FIG. 10 illustrates the details of a 16 QAM processing block as shown in FIG. 9.

Each of the M 16 QAM processing blocks $QAM_0$–$QAM_{M-1}$ has the same structure. FIG. 10 illustrates one embodiment of the structure for a 16 QAM processing block QAM. As shown, a first QPSK processing block (first QPB) 50 receives the first and second bits $b_0,b_1$ and a coefficient output from the coefficient register 18. The coefficient register 18 in each of the M QAM processing blocks $QAM_0$–$QAM_{M-1}$ is the same as the coefficient register 18 in the M QPSK processing blocks $QPB_0$–$QPB_{M-1}$; and therefore, the operation thereof will not be described.

The real and imaginary outputs of the first QPB 50 are connected to the real and imaginary inputs of a second QPB 52. The second QPB 52 receives the third and fourth bits $b_2$, $b_3$ and the coefficient stored in the coefficient register 18 as shifted by a shift register 56. The shift register 56 shifts the coefficient output from the coefficient register 18 such that the resulting output is the coefficient multiplied by two.

Figure 11:
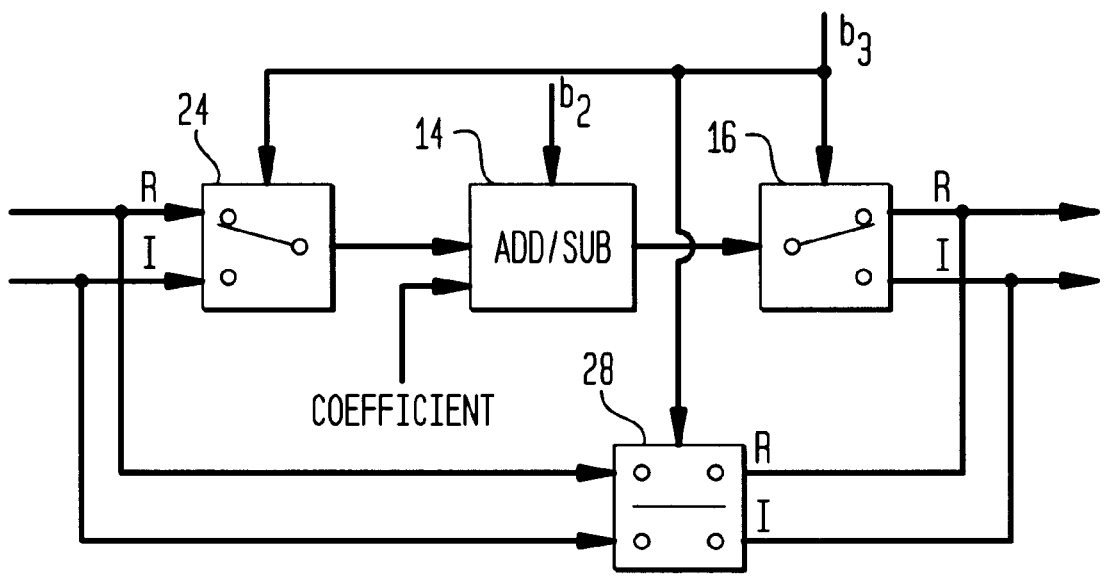
FIG. 11 illustrates the details of a second QPSK processing block as shown in FIG. 10.

The first QPB 50 can have the structure of the QPSK processing block such as shown in FIG. 6 of the present invention. Accordingly, a description of the structure and operation thereof will not be repeated. The second QPB 52 has a structure as shown in FIG. 11, which is similar to that of the first QPB 50 except that the second switch 24 and the third switch 28 have been added thereto. The second and third switches 24 and 28 receive the real and imaginary values output from the first QPB 50. The operation of the second QPB 52 should be readily apparent from the above description of the add/subtract block 14, the first switch 16, the second switch 24 and the third switch 28 with respect to FIG. 7. Accordingly, the operation of the second QPB 52 will be omitted for the sake of brevity.

Figure 12:
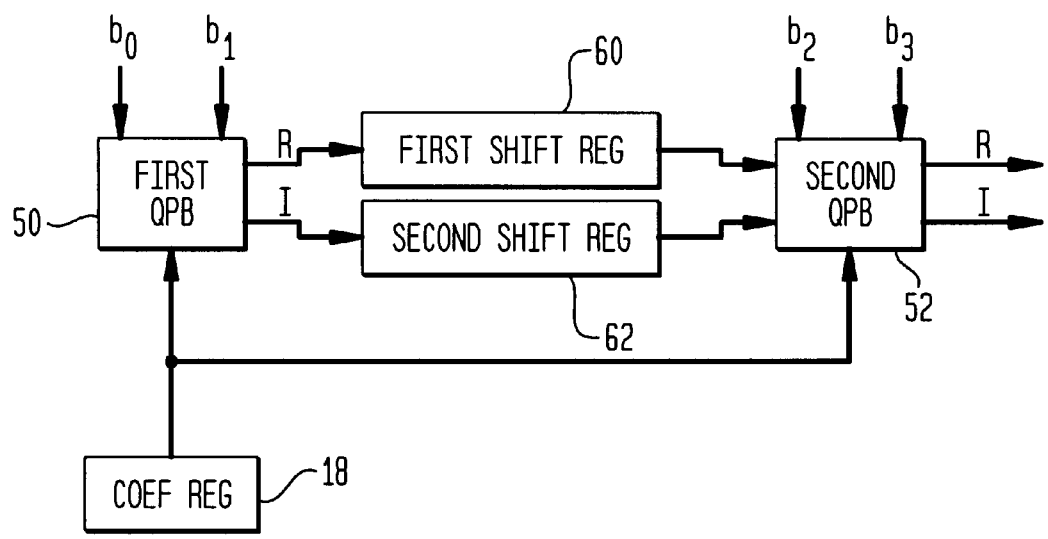
FIG. 12 illustrates the details of the 16 QAM processing block shown in FIG. 9 according to another embodiment.

FIG. 12 illustrates a second embodiment of a 16 QAM processing block QAM. The structure of the 16 QAM processing block shown in FIG. 12 is substantially similar to that shown in FIG. 11, except that the shift register 56 has been eliminated, and first and second shift registers 60 and 62 have been disposed between the first and second QPBs 50 and 52. The first and second shift registers 60 and 62 shift the real and imaginary outputs of the first QPB 50 to the left by one bit to achieve the same effect as doubling the coefficient output from the coefficient register 18 as was achieved in the embodiment of FIG. 11 through the shift register 56. The remainder of the second embodiment of the 16 QAM processing block QAM in FIG. 12 is the same as that described above with respect to FIG. 11, and therefore will not be repeated.

As one skilled in the art will appreciate from the above description, the implementation of the 16 QAM pulse shaper is not limited to that illustrated in FIG. 9. Instead, as was discussed above with respect to the QPSK pulse shaper, various modifications are possible. For instance, the 16 QAM pulse shaper shown in FIG. 9 consumes considerable chip space, but provides extremely fast processing. Instead, hardware requirements can be considerably reduced by adopting structures similar to that described above with respect to FIG. 7 of the QPSK pulse shaper. One skilled in the art will readily appreciate from the foregoing disclosure how to implement a 16 QAM structure similar to that described above with respect to FIG. 7.

Figure 13:
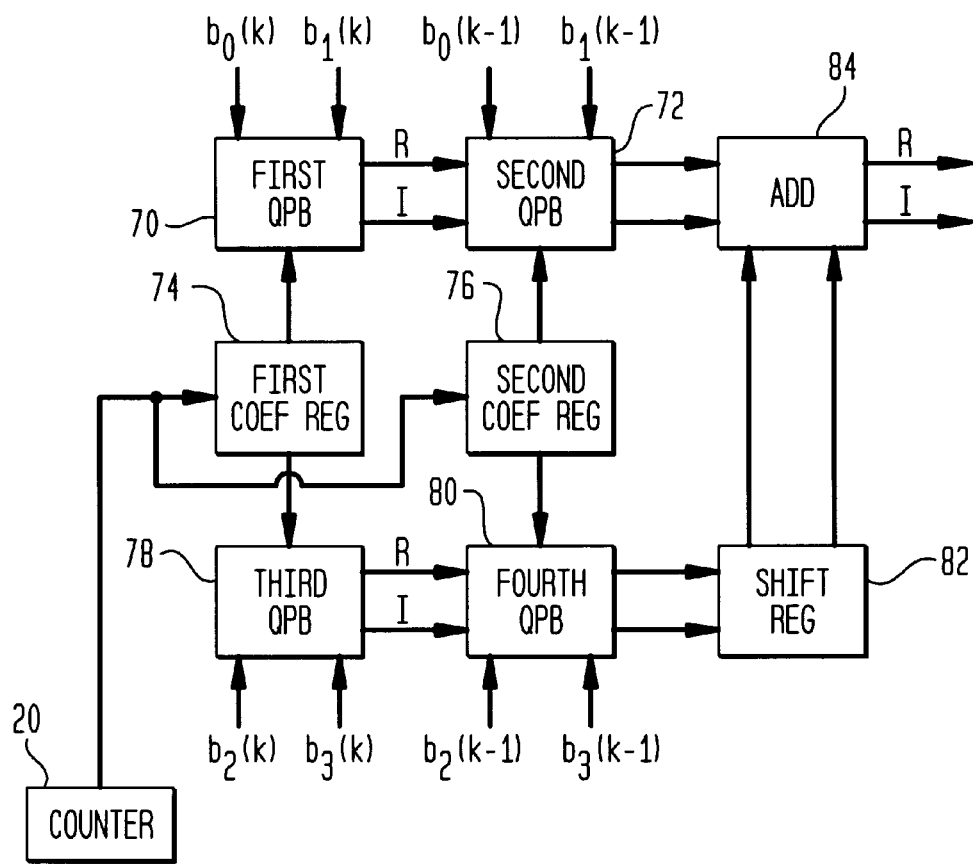
FIG. 13 illustrates a cascading technique which could form the basis of another embodiment of a 16 QAM pulse shaping apparatus according to the present invention.

FIG. 13 illustrates a cascading technique which could form the basis of another embodiment of a 16 QAM pulse shaper according to the present invention. Namely, FIG. 13 only shows the details for M=2 (i.e., a filter length of 2). For an arbitrary M, the cascade structure consists of M times a number depending on the modulation processing blocks (e.g., 2M for 16 QAM and 3M for 64 QAM). As shown, a first QPB 70 is connected to a second QPB 72. The first and second QPBs 70 and 72 have the structure as shown in FIG. 6 and FIG. 11, respectively. Both the first and second QPBs 70 and 72 receive first and second bits $b_0, b_1$, but the first QPB 70 receives the first and second bits $b_0, b_1$ for the kth symbol while the second QPB 72 receives the first and second bits $b_0, b_1$ for the (k−1)th symbol. Similarly, a third QPB 78 is connected to a fourth QPB 80. The third and fourth QPBs 78 and 80 have the same structure as the first and second QPBs 70 and 72, respectively.

The third QPB 78 receives the third and fourth bits $b_2, b_3$ for the kth symbol, and the fourth QPB 80 receives the third and fourth bits $b_2, b_3$ for the (k−1)th symbol. The first and third QPBs 70 and 78 receive a coefficient output from a first coefficient register 74. The second and fourth QPBs 72 and 80 receive a coefficient output from a second coefficient register 76. Both the first and second coefficient registers 74 and 76 are the same as the coefficient register 18 and operate in the same manner in response to the phase count from the counter 20, except that the first coefficient register 74 stores the coefficients associated with the kth symbol (e.g., $c_0$–$c_3$ in Table 2) and the second coefficient register 76 stores the coefficients associated with the (k−1)th symbol (e.g., $c_4$–$c_7$). Because the operation of the first, second, third and fourth QPBs 70, 72, 78 and 80 has been discussed above with respect to FIGS. 6 and 11 (or 12), the operation thereof will not be repeated.

The output of the fourth QPB 80 is shifted by a shift register 82 to double the output of the fourth QPB 80. An adder 84 then respectively adds the real and imaginary values from the second QPB 72 and the shift register 82. By repeating the cascade structure shown in FIG. 13 over M coefficients, a complete 16 QAM pulse shaper is obtained.

32, 64 AND HIGHER QAM PULSE SHAPERS

Figure 14:
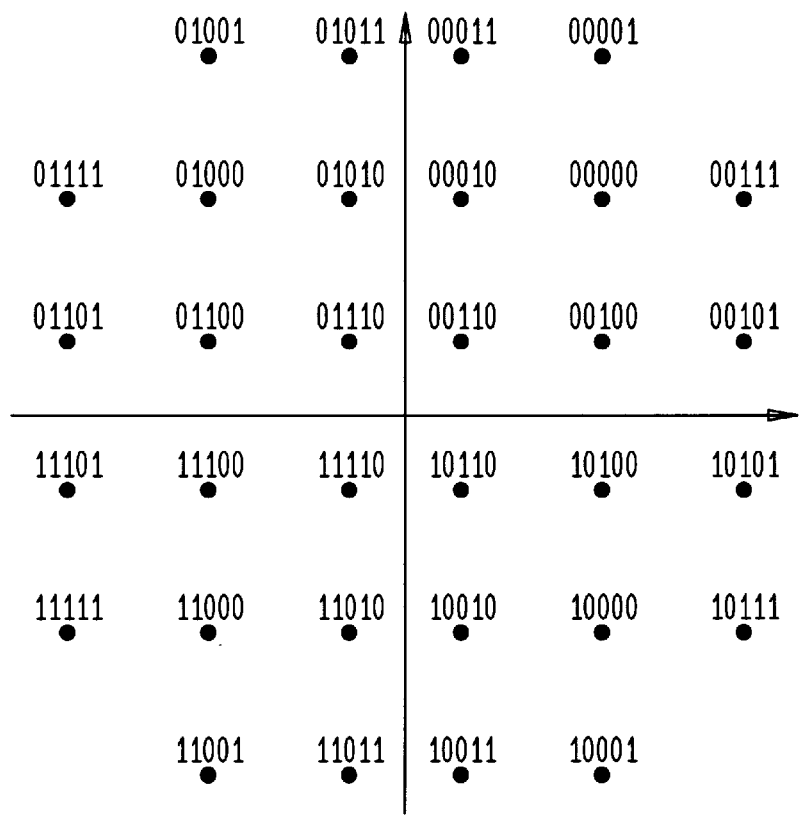
FIG. 14 illustrates the mapping of the five 32 quadrature amplitude modulation bits into the six bits of a 64 quadrature amplitude modulation constellation.

In view of the foregoing, one skilled in the art will readily appreciate that 64 QAM and higher order QAM pulse shapers can be structured in accordance with the foregoing description. Namely, as each higher order QAM pulse shaper receives an additional pair of bits, an additional QPB processing block, for example as illustrated in FIG. 11 or 12, will be needed in each embodiment of a higher order QAM processing block. Furthermore, one skilled in the art will readily appreciate that 32 QAM pulse shaping and the like, can be obtained from a subset of the next higher ordered QAM modulation scheme. For instance, 32 QAM pulse shaping can be obtained using the structure for 64 QAM pulse shaping. This is achieved by mapping the five 32 QAM bits to the 6 bits in the 64 QAM constellation such as shown in FIG. 14.

8 PSK PULSE SHAPING

In a similar manner to how the 16 QAM constellation can be split into four QPSK constellations, the 8 PSK constellation can be split into two QPSK constellations. The two constellations being $\{1, j, -1, -j\}$ and $\{1, j, -1, -j\}*\exp(j\pi/4)$. Since these two subsets are just rotated versions of each other, the basic QPSK pulse shaping operation according to the present invention can remain substantially the same except for a correction to be made at the end of the operation.

It is assumed that the 8 PSK symbol is represented by a 3 bit word $b_2 b_1 b_0$. The two lower bits can be interpreted as before in QPSK pulse shaping, while the upper bit now defines one of the two QPSK constellations into which the 8 PSK constellation was split. Thus the previous structure as discussed above can remain substantially the same as will be described below. To place 8 PSK in better context, equations (2) and (3) discussed above can now be split into their two respective subsets corresponding to the two QPSK pulse shaping operations forming the 8 PSK pulse shaping operation. Namely, equations (4) and (5) below represent a first QPSK constellation for 8 PSK, and equations (6) and (7) represent the second QPSK pulse shaping operation for 8 PSK pulse shaping.

$$\text{Real}(p_{I,l}(k)) = \sum_{m=0}^{M-1} c(Lm+l)(1-2b_0(k-m))(1-b_1(k-m))b_2(k-m) \quad (4)$$

$$\text{for } l = 0, 1, \ldots, L-1$$

$$\text{Imag}(p_{I,l}(k)) = \sum_{m=0}^{M-1} c(Lm+l)(1-2b_0(k-m))(1-b_1(k-m))b_2(k-m) \quad (5)$$

$$\text{for } l = 0, 1, \ldots, L-1$$

$$\text{Real}(p_{II,l}(k)) = \quad (6)$$

$$\sum_{m=0}^{M-1} c(Lm+l)(1-2b_0(k-m))(1-b_1(k-m))(1-b_2(k-m))$$

$$\text{for } l = 0, 1, \ldots, L-1$$

$$\text{Imag}(p_{II,l}(k)) = \quad (7)$$

$$\sum_{m=0}^{M-1} c(Lm+l)(1-2b_0(k-m))b_1(k-m)(1-b_2(k-m))$$

$$\text{for } l = 0, 1, \ldots, L-1$$

Finally, the respective real and imaginary outputs can be added according to equations (8) and (9) below to obtain the real and imaginary 8 PSK pulse shaping outputs.

$$\text{Real}(p_l(k)) = \text{Real}(p_{I,l}(k)) + 0.707(\text{Real}(p_{II,l}(k)) - \text{Imag}(p_{II,l}(k))) \quad (8)$$

$$\text{for } l = 0, 1, \ldots, L-1$$

$$\text{Imag}(p_l(k)) = \text{Imag}(p_{I,l}(k)) + 0.707(\text{Real}(p_{II,l}(k)) + \text{Imag}(p_{II,l}(k))) \quad (9)$$

$$\text{for } l = 0, 1, \ldots, L-1$$

As discussed above, the 8 PSK pulse shaping apparatus can have substantially the same structure as discussed with respect to the QPSK pulse shaping apparatus. For instance, the 8 PSK pulse shaper can have the same structure as the QPSK pulse shaper shown in FIG. 5, except that each processing block of FIG. 5 has the structure shown in FIG. 15 and the real and imaginary adders 10 and 12 are replaced by the structure shown in FIG. 16. Accordingly, only these differences will be described.

As shown in FIG. 15, each processing block for 8 PSK pulse shaping has substantially the same structure as shown in FIG. 6, except that the first switch 16 of FIG. 6 has been replaced by first switch 90 in FIG. 15. The first switch 90 receives the second and third bits $b_1, b_2$, and based on the values of these bits supplies the output of the add/subtract block 14 to one of a first real output, a first imaginary output, a second real output, and a second imaginary output. Namely, the first switch 90 supplies the output of the add/subtract block 14 to the appropriate output based on the values of the second and third bits $b_1, b_2$ as shown in Table 3 below.

TABLE 3

| $b_1$ | $b_2$ | Output |
|---|---|---|
| 0 | 0 | REI |
| 0 | 1 | REII |
| 1 | 0 | IMI |
| 1 | 1 | IMII |

FIG. 16 illustrates the structure replacing the real and imaginary adders 10 and 12. For the purposes of discussion only, the structure of FIG. 16 will be described with respect to replacing the real adder 10, but this description is equally applicable to the replacement of the imaginary adder 12. As shown, a first adder 100 adds the first real output values from the 8 PSK processing blocks, and a second adder 102 adds the second real output values from the 8 PSK processing blocks. A multiplier 104 multiplies the output of the second adder 102, by expo(jπ/4), and a third adder 106 adds the output of the first adder 100 and the multiplier 104 to obtain the real output of the 8 PSK pulse shaper.

As with the QPSK pulse shaper, the 8 PSK pulse shaper can be embodied in various forms to reduce the amount of required chip space at the expense of processing speed.

It will further be understood that similar processing schemes can be applied to achieve 16 PSK pulse shaping, 32 PSK pulse shaping, etc. according to the present invention.

Also, one skilled in the art will appreciate from the foregoing that each of the pulse shaper embodiments according to the present invention can have any number of processing blocks concatenated to obtain longer filter lengths.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of pulse shaping, comprising:
   a) receiving at least a first set of bits representing a first symbol;
   b) generating a value by one of adding and subtracting a received coefficient and a received value based on at least a first predetermined one of said first set of bits; and
   c) supplying said generated value as one of a real output value and an imaginary output value based on at least a second predetermined one of said first set of bits.

2. The method of claim 1, wherein said step b) comprises:
   b1) storing a plurality of coefficients in a memory;
   b2) receiving a phase count indicating a phase of pulse shaping; and
   b3) accessing one of said plurality of coefficients from said memory as said received coefficient based on said phase count.

3. The method of claim 1, wherein
   said step a) receives first-Mth sets of bits representing first-Mth symbols;
   said step b) generates values corresponding to said first-Mth sets of bits, each value being generated by one of adding and subtracting a received coefficient corresponding to each of said first-Mth sets of bits and a received value based on said first predetermine bit in said corresponding one of said first-Mth sets of bits; and
   said step c) supplies each of said generated values as one of said real output value and said imaginary output value based on said second predetermined bit in said corresponding one of said first-Mth sets of bits; and further including,
   d) adding said real output values supplied by said step c) to produce a real output; and
   e) adding said imaginary output values supplied by said step c) to produce an imaginary output.

4. The method of claim 3, wherein
   said step a) receives said first-Mth sets of bits simultaneously;
   said step b) generates said generated values simultaneously; and
   said step c) supplies said generated values simultaneously.

5. The method of claim 4, further comprising:
   f) generating a phase count indicating a cycle of pulse shaping; and wherein
   said step b) includes the steps of,
      b1) storing a plurality of coefficients, each stored coefficient corresponding to one of said cycles of said pulse shaping,
      b2) accessing, for each of said first-Mth sets of bits, one of said stored coefficients based on said phase count, and
      b3) outputting said accessed coefficient for each of said first-Mth set of bits as said received coefficient for each of said first-Mth sets of bits.

6. The method of claim 3, further comprising:
   f) generating a phase count indicating a cycle of pulse shaping for first-Mth sets of bits; and wherein
   said step b) includes the steps of,
      b1) storing a plurality of coefficients, each stored coefficient corresponding to one of said first-Mth sets of bits and one of said cycles of said pulse shaping,
      b2) accessing, for each of said first-Mth sets of bits, one of said stored coefficients corresponding thereto based on said phase count, and
      b3) outputting said accessed coefficients corresponding to said first-Mth set of bits as said received coefficients for said first-Mth sets of bits, respectively.

7. The method of claim 1, further comprising:
   d) supplying one of a previously supplied real value and a previously supplied imaginary value based on said second predetermined bit in said first set of bits to said step b) as said received value.

8. The method of claim 1, further comprising:
   d) storing a real value and an imaginary value in a memory; and
   e) supplying one of said stored real value and s aid stored imaginary value based on said second predetermined bit in said first set of bits to said step b) as said received value.

9. The method of claim 8, further comprising:
   f) replacing said stored real value with said real output value in said memory when said step c) outputs said real output value;

g) replacing said stored imaginary value with said imaginary output value in said memory when said step c) outputs said imaginary output value.

10. The method of claim 9, further comprising:

h) repeating said steps a)–e) for at least a second set of bits.

11. The method of claim 10, wherein said step h) repeats said steps a)–g) for said second set of bits through an Mth set of bits; and further including i) storing a plurality of coefficients, each stored coefficient corresponding to one of said first-Mth sets of bits; and wherein said step b) performs one of addition and subtraction using said stored coefficient corresponding to a currently received one of said first-Mth sets of bits as said received coefficient.

12. The method of claim 11, further comprising:

j) generating a phase count representing a cycle of pulse shaping; and wherein said step i) stores a plurality of coefficients corresponding to said first-Mth sets of bits for each cycle; and said step b) performs one of addition and subtraction using said stored coefficient corresponding to a currently received one of said first-Mth sets of bits and said phase count as said received coefficient.

13. A pulse shaper, comprising:

an arithmetic block receiving at least a first predetermined one of a set of bits, a value and a coefficient, and performing one of addition and subtraction between said received value and said received coefficient based on said first predetermined bit in said set of bits; and a first selector selectively supplying output from said arithmetic block as one of a real output value and an imaginary output value based on at least a second predetermined one of said set of bits.

14. The pulse shaper of claim 13, further comprising:

a coefficient register storing a plurality of coefficients, receiving a phase count indicating a cycle of said pulse shaper, and outputting one of said stored coefficients to said arithmetic block as said received coefficient based on said phase count.

15. The pulse shaper of claim 14, further comprising:

a second selector receiving a real value and an imaginary value, and selectively supplying one of said real and imaginary values as said received value to said arithmetic block based on said second predetermined bit in said set of bits.

16. The pulse shaper of claim 15, further comprising:

a latch storing said real and imaginary values.

17. The pulse shaper of claim 16, wherein said latch replaces said real value stored therein with said real output value when said first selector outputs said real output value, and replaces said imaginary value stored therein with said imaginary output value when said first selector outputs said imaginary output value.

18. The pulse shaper of claim 17, further comprising:

a coefficient register receiving a phase count indicating a cycle of said pulse shaper, storing a plurality of coefficients corresponding to first through Mth sets of bits for each cycle, and outputting one of said stored coefficients corresponding to a currently received one of said first-Mth sets of bits to said arithmetic block as said received coefficient based on said phase count.

19. The pulse shaper of claim 17, further comprising:

a bit register storing first-Mth sets of bits and sequentially supplying said first and second predetermined bits in first-Mth sets of bit to said arithmetic block and said first selector, respectively.

20. The pulse shaper of claim 13, wherein said arithmetic block and said first selector form a processing block, and further including, a plurality of processing blocks wherein each processing block receives a different set of bits.

21. The pulse shaper of claim 20, further comprising:

a real adder for adding said real output value output by said plurality of processing blocks; and an imaginary adder for adding said imaginary output values output by said plurality of processing blocks.

22. The pulse shaper of claim 20, wherein each processing block further comprises:

a coefficient register storing a plurality of coefficients, receiving a phase count indicating a cycle of said pulse shaper, and outputting one of said stored coefficients to said arithmetic block as said received coefficient based on said phase count.

* * * * *